US009488798B2

(12) United States Patent
Sasaki

(10) Patent No.: US 9,488,798 B2
(45) Date of Patent: Nov. 8, 2016

(54) ZOOM LENS BARREL

(71) Applicant: HOYA CORPORATION, Tokyo (JP)

(72) Inventor: Takamitsu Sasaki, Saitama (JP)

(73) Assignee: HOYA CORPORATION, Tokyo (JP)

( * ) Notice: Subject to any disclaimer, the term of this patent is extended or adjusted under 35 U.S.C. 154(b) by 596 days.

(21) Appl. No.: 13/739,221

(22) Filed: Jan. 11, 2013

(65) Prior Publication Data

US 2013/0188262 A1 Jul. 25, 2013

(30) Foreign Application Priority Data

Jan. 25, 2012 (JP) ................................ 2012-012671

(51) Int. Cl.
| | | |
|---|---|---|
| G02B 15/14 | (2006.01) | |
| G02B 9/00 | (2006.01) | |
| G02B 7/02 | (2006.01) | |
| G03B 17/00 | (2006.01) | |
| G02B 7/10 | (2006.01) | |
| G03B 5/00 | (2006.01) | |
| G03B 9/02 | (2006.01) | |

(52) U.S. Cl.
CPC . *G02B 7/10* (2013.01); *G03B 5/00* (2013.01); *G03B 9/02* (2013.01); *G03B 2205/0046* (2013.01); *G03B 2205/0053* (2013.01)

(58) Field of Classification Search
CPC .... H02N 5/23296; G02B 7/102; G02B 7/10; G02B 15/173; G02B 5/005; G02B 13/00; G02B 25/002; G02B 7/021; G02B 7/02; G02C 7/08; G11B 7/0932; G11B 7/0935
USPC ....... 359/704, 703, 694, 676, 691, 739, 738, 359/740, 808, 811–830; 396/79; 348/240.99–240.3
See application file for complete search history.

(56) References Cited

U.S. PATENT DOCUMENTS

| | | | |
|---|---|---|---|
| 5,842,055 A | 11/1998 | Tamura | |
| 7,835,088 B2 | 11/2010 | Nomura et al. | |
| 8,059,953 B2 | 11/2011 | Nomura | |
| 2006/0056078 A1* | 3/2006 | Nomura et al. | 359/811 |
| 2006/0181632 A1* | 8/2006 | Makii et al. | 348/335 |

FOREIGN PATENT DOCUMENTS

| | | |
|---|---|---|
| JP | 06-201966 | 7/1994 |
| JP | 2002-196210 | 7/2002 |

(Continued)

OTHER PUBLICATIONS

Office Action issued in Japan Counterpart Patent Appl. No. 2012-012671, dated Aug. 25, 2015 , along with an English translation thereof.

*Primary Examiner* — Dwayne A Pinkney
(74) *Attorney, Agent, or Firm* — Greenblum & Bernstein, P.L.C.

(57) ABSTRACT

A zoom lens barrel includes front and rear lens group support frames, a first spring member provided to bias the front lens group support frame and a diaphragm in directions away from each other, and a second spring member provided to bias the diaphragm and the rear lens group support frame in directions away from each other. Spring loads of the first and second spring members are determined such that, when the front and rear lens group support frames approach each other during zooming, one and the other of the first and second spring members are compressed and not compressed, and the other of the first and second spring members is compressed after the one of the first and second spring members is fully compressed.

10 Claims, 8 Drawing Sheets

(56) References Cited

FOREIGN PATENT DOCUMENTS

| JP | 2002-214667 | 7/2002 |
| JP | 2005-345620 | 12/2005 |
| JP | 3754758 B2 | 3/2006 |
| JP | 2009-192815 | 8/2009 |

\* cited by examiner

ZOOM LENS BARREL

BACKGROUND OF THE INVENTION

1. Field of the Invention

The present invention relates to a zoom lens barrel.

2. Description of the Related Art

A zoom lens barrel having a diaphragm, which is movable in the optical axis direction, the aperture diameter of which is fixed and which limits the amount of light passing therethrough depending on the position of the diaphragm in an optical axis direction, is known in the art. Japanese Unexamined Patent Publication 2009-192815 shows a support structure for such a diaphragm. In this support structure, the diaphragm is positioned between a first lens group frame and a second lens group frame, a spring member and another spring member are installed between the first lens group frame and the diaphragm and between the diaphragm and the second lens group frame, respectively, and the diaphragm is supported in a floating state (suspended state) by balancing the spring forces of these two spring members during zooming.

However, the spring forces of identical spring members usually vary by some degree (e.g., ±15%) due to manufacturing error, and accordingly, in Japanese Unexamined Patent Publication 2009-192815, the spring forces of the two spring members cannot be equally balanced out at all times during zooming, so that the position of the diaphragm in the optical axis direction cannot be determined with precision. Consequently, the amount of light passing through the diaphragm cannot be controlled with precision, which makes it impossible to achieve a desired diaphragm effect (stop-down effect).

SUMMARY OF THE INVENTION

The present invention has been devised in view of the above-mentioned drawbacks and provides a zoom lens barrel which can determine the position of the diaphragm, which is movable in the optical axis direction, during zooming.

According to an aspect of the present invention, a zoom lens barrel is provided, including a front lens group, a rear lens group and a diaphragm, which is movable in the optical axis direction and positioned between the front lens group and the second lens group, wherein the front lens group, the rear lens group and the diaphragm are supported to be movable relative to one another in an optical axis direction and move relative to one another in the optical axis direction during zooming, the zoom lens barrel includes a front lens group support frame which supports the front lens group; a rear lens group support frame which supports the rear lens group; a first spring member provided between the front lens group support frame and the diaphragm to bias the front lens group support frame and the diaphragm in directions away from each other; and a second spring member provided between the diaphragm and the rear lens group support frame to bias the diaphragm and the rear lens group support frame in directions away from each other. Spring loads of the first spring member and the second spring member are determined such that, when the front lens group support frame and the rear lens group support frame approach each other during zooming, one of the first spring member and the second spring member is compressed and the other of the first spring member and the second spring member not compressed, and subsequently, the other of the first spring member and the second spring member is compressed after the one of the first spring member and the second spring member is fully compressed.

It is desirable for the zoom lens barrel to include a stopper which defines a maximum distance between the front lens group support frame and the diaphragm, while maintaining a fully extended state of the first spring member at a time of installation thereof.

It is desirable for the stopper to include a contact engagement portion provided on each of the front lens group support frame and the diaphragm, wherein engagement between the contact engagement portions of the front lens group support frame and the diaphragm defines the maximum distance between the front lens group support frame and the diaphragm.

It is desirable for the zoom lens barrel to include a stopper which defines a maximum distance between the diaphragm and the rear lens group support frame, while maintaining a fully extended state of the second spring member at a time of installation thereof.

It is desirable for the stopper to include a contact engagement portion provided on each of the diaphragm and the rear lens group support frame, wherein engagement between the contact engagement portions of the diaphragm and the rear lens group support frame defines the maximum distance between the diaphragm and the rear lens group support frame.

It is desirable for a spring load of one of the first spring member and the second spring member in a fully compressed state to be set smaller than a spring load of the other of the first spring member and the second spring member in a fully extended state at a time of installation thereof.

It is desirable for the following condition to be satisfied:

$$PY/PX \geq 1.5,$$

wherein PX represents the spring load of the one of the first spring member and the second spring member in the fully compressed state, and PY represents the spring load of the other of the first spring member and the second spring member in the fully extended state at the time of installation thereof.

When the front lens group support frame and the rear lens group support frame approach each other during zooming, it is desirable for the first spring member to be compressed while the second spring member is not compressed, and subsequently, for the second spring member to be compressed after the first spring member is fully compressed.

When the front lens group support frame and the rear lens group support frame approach each other during zooming, it is desirable for the second spring member to be compressed while the first spring member is not compressed, and subsequently, for the first spring member to be compressed after the second spring member is fully compressed.

It is desirable for each of the first spring member and the second spring member to be a compression coil spring.

According to the present invention, a zoom lens barrel which can determine the position of the diaphragm in an optical axis direction during zooming is achieved.

The present disclosure relates to subject matter contained in Japanese Patent Application No. 2012-012671 (filed on Jan. 25, 2012) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
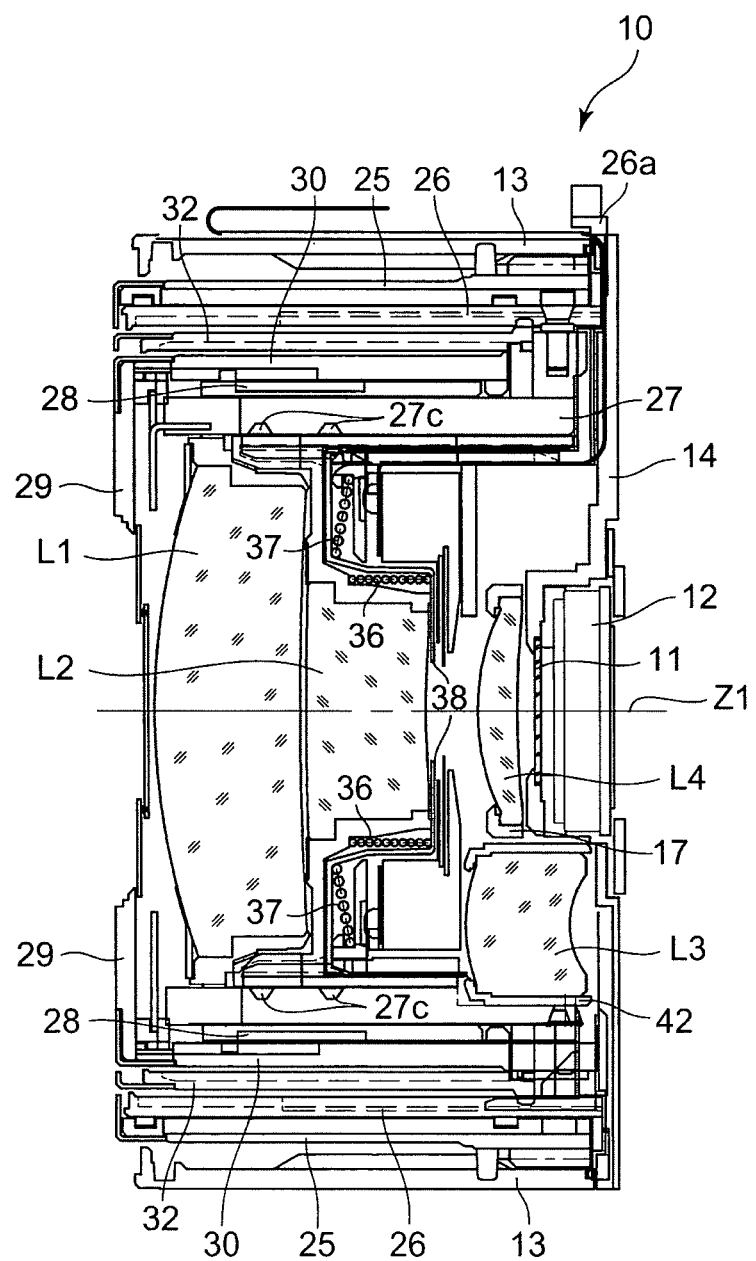
FIG. 1 is a cross sectional view of a zoom lens barrel according to the present invention, showing a lens barrel accommodated state (fully-retracted state) of the zoom lens barrel.
Figure 2:
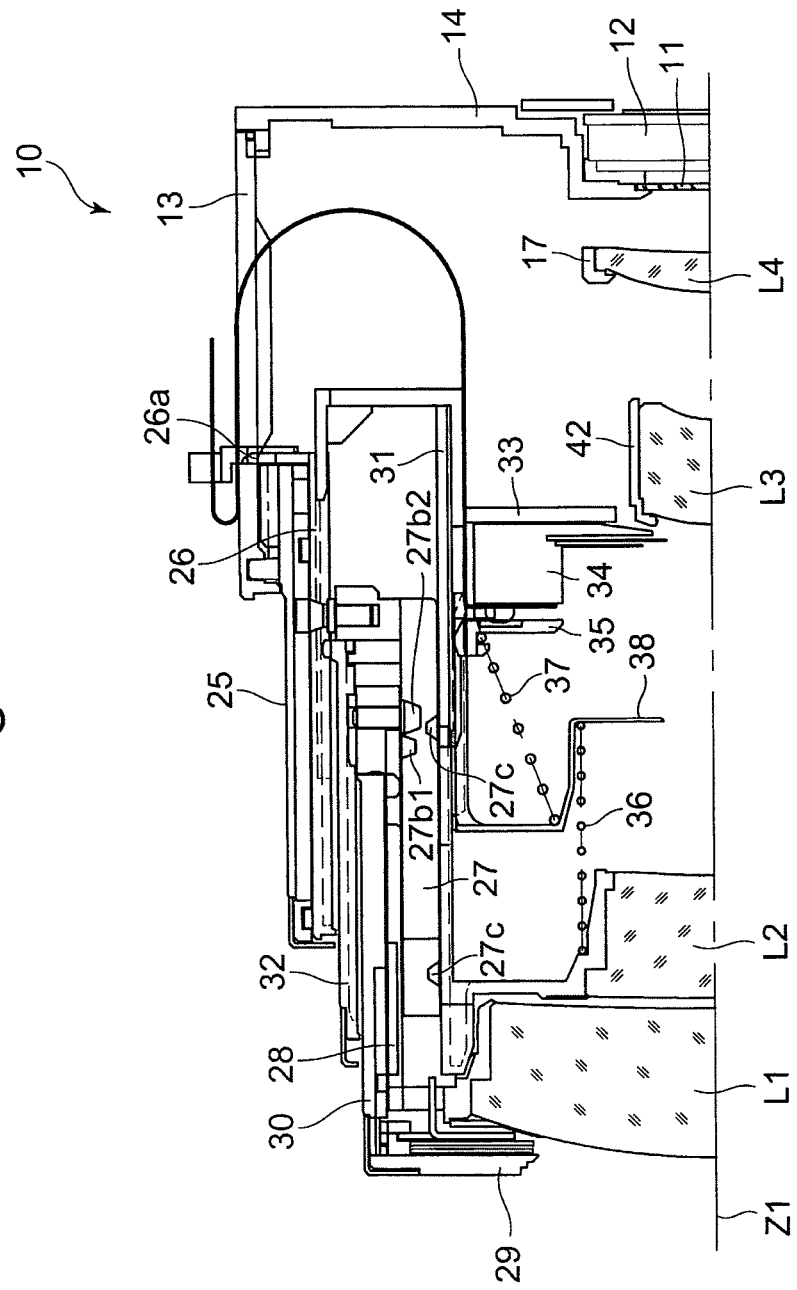
FIG. 2 is a cross sectional view of an upper half of the zoom lens barrel in a ready-to-photograph state which is set at the wide-angle extremity.
Figure 3:
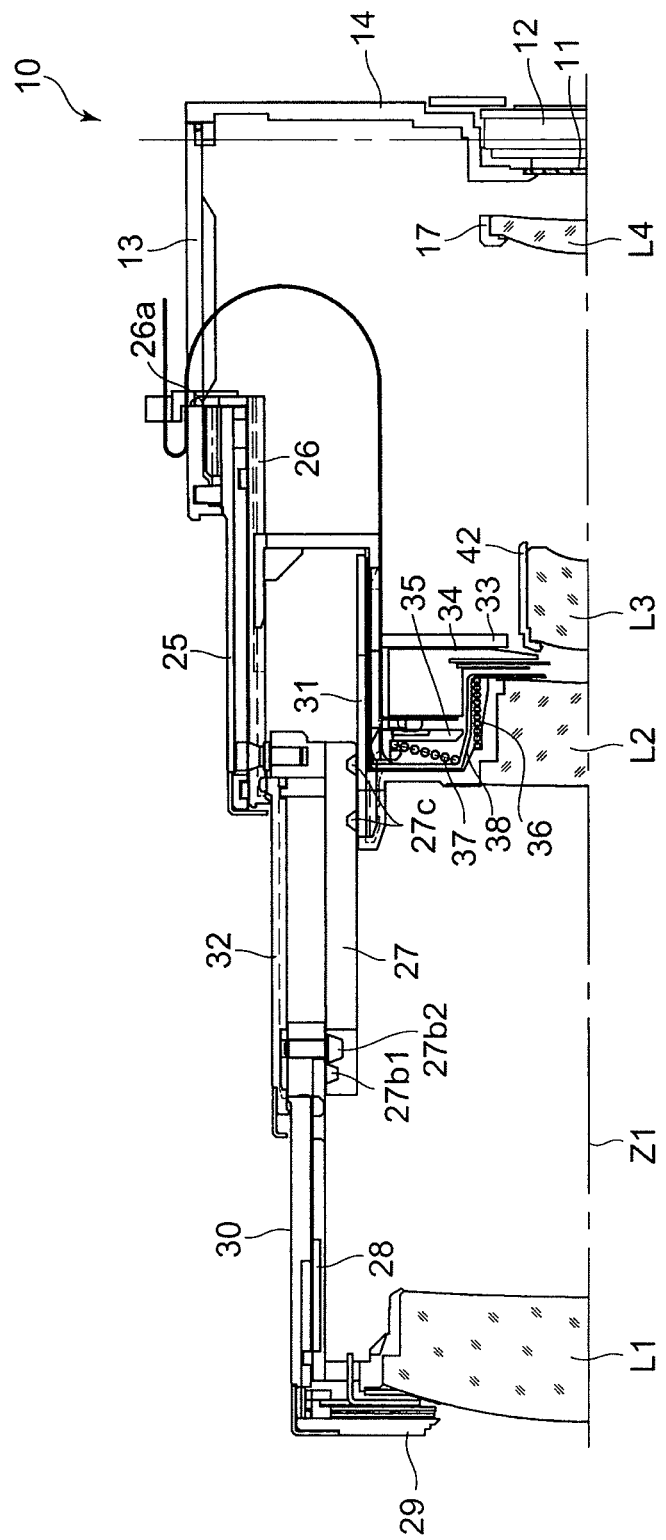
FIG. 3 is a cross sectional view of an upper half of the zoom lens barrel in a ready-to-photograph state which is set at the telephoto extremity.
Figure 4:
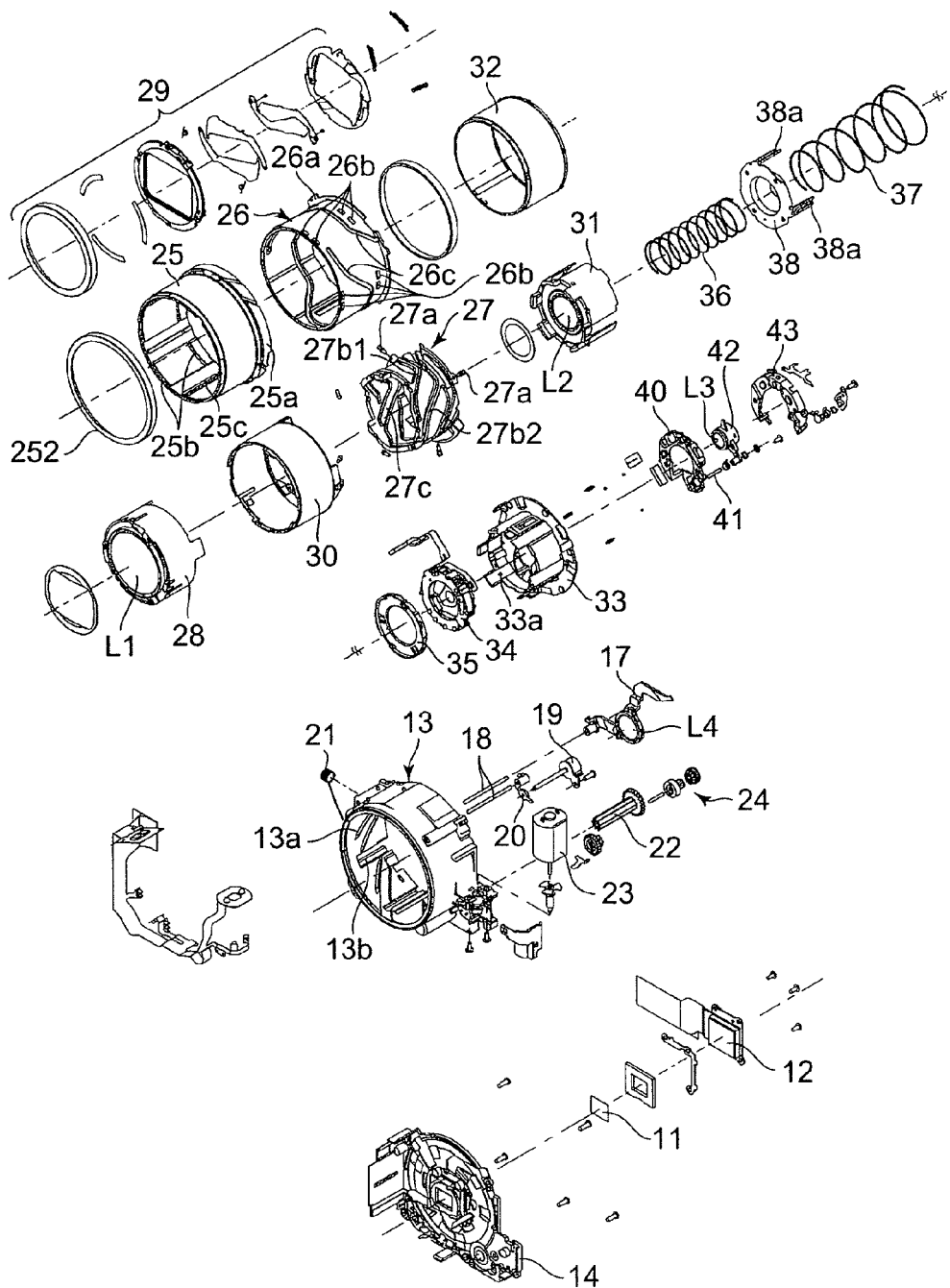
FIG. 4 is an exploded perspective view of the zoom lens barrel.

First, main elements of a zoom lens barrel 10 according to the present invention will be hereinafter discussed with reference to FIGS. 1 through 4. FIG. 1 is a longitudinal cross sectional view of the zoom lens barrel 10 in the lens barrel accommodated state (fully retracted state), FIG. 2 is a cross sectional view of an upper half of the zoom lens barrel 10 in a ready-to-photograph state which is set at the wide-angle extremity, FIG. 3 is a cross sectional view of an upper half of the zoom lens barrel 10 in a ready-to-photograph state which is set at the telephoto extremity, and FIG. 4 is an exploded perspective view of the zoom lens barrel 10. As shown in FIGS. 2 and 3, the zoom lens barrel 10 is provided with a photographing optical system (imaging optical system) including a first lens group L1, a second lens group (front lens group) L2, a shutter (diaphragm) 34, a third lens group (rear lens group/removable optical element) L3, a fourth lens group L4, a filter (optical filter) 11 and an image sensor (image pickup device) 12, in that order from the object side. "Z1" shown in FIGS. 1 through 3 designates the photographing optical axis of the photographing optical system. The first lens group L1, the second lens group L2 and the third lens group L3 are driven along the photographing optical axis Z1 in a predetermined moving manner to perform a zooming operation, and the fourth lens group L4 is driven along the photographing optical axis Z1 to perform a focusing operation. In the following descriptions, the term "optical axis direction" refers to a direction along or parallel to the photographing optical axis Z1 and the term "guiding linearly" refers to guiding linearly in the optical axis direction unless otherwise defined. In addition, the terms "front" and "rear" refer to object side and image plane side, respectively.

The zoom lens barrel 10 is incorporated in a camera body (not shown), and is provided with a stationary barrel 13 fixed to the camera body, and an image sensor holder 14 fixed to the rear of the stationary barrel 13. The image sensor 12 is mounted to a central portion of the image sensor holder 14. The filter 11 is held by the image sensor holder 14 to be positioned in front of the image sensor 12.

The zoom lens barrel 10 is provided in the stationary barrel 13 with an AF lens frame (a fourth lens group frame which supports and holds the fourth lens group L4) 17 which is supported to be movable linearly in the optical axis direction without rotating about the photographing optical axis Z1. The zoom lens barrel 10 is provided with a pair of AF guide shafts 18 (see FIG. 4) which guide the AF lens frame 17 in the optical axis direction without rotating the AF lens frame 17 about the photographing optical axis Z1. Front and rear ends of each guide shaft 18 are fixed to the stationary barrel 13 and the image sensor holder 14, respectively, so that each guide shaft 18 extends parallel to the photographing optical axis Z1. The AF lens frame 17 is provided with a guide hole (guide groove) in which one of the pair of AF guide shafts 18 is fitted so that the AF lens frame 17 is slidable thereon, and an AF nut 20 is also provided with a guide hole in which the other of the pair of AF guide shafts 18 is fitted so that the AF nut 20 is slidable thereon.

The zoom lens barrel 10 is provided therein with an AF motor 19, and the AF lens frame 17 moves forward and rearward in the optical axis direction by a driving force of the AF motor 19. A rotary drive shaft of the AF motor 19 is threaded to serve as a feed screw shaft (rotatable lead screw), and this rotary drive shaft is screwed through a female screw hole formed in the AF nut 20. The AF lens frame 17 is engaged with the AF nut 20 to be slidable thereon in the optical axis direction, and is biased forward in the optical axis direction by an AF frame biasing spring (torsion spring) 21, and the forward movement limit of the AF lens frame 17 is determined by making the AF lens frame 17 abut against the AF nut 20 by the biasing force of the AF frame biasing spring 21. A rearward movement of the AF nut 20 in the optical axis direction by a rotation of the rotary drive shaft of the AF motor 19 causes the AF lens frame 17 to be pressed rearwardly by the AF nut 20 to be moved rearwardly against the biasing force of the AF frame biasing spring 21. Due to this structure, rotating the rotary drive shaft of AF motor 19 forward and rearward causes the AF lens frame 17 to move forward and rearward in the optical axis direction.

The zoom lens barrel 10 is provided with a zoom gear (long pinion) 22 which is supported by the stationary barrel 13 to be rotatable on an axis extending parallel to the photographing optical axis Z1. The zoom gear 22 is positioned so that the gear teeth thereof are partly inserted inside the stationary barrel 13 to be exposed through an inner peripheral surface of the stationary barrel 13, and can be rotated forwardly and reversely by a zoom motor 23 via a gear train 24.

The stationary barrel 13 is provided on an inner peripheral surface thereof with a female helicoid 13a, and a plurality of linear guide grooves 13b (only one of which is shown in FIG. 4) which extend parallel to the photographing optical axis Z1. The zoom lens barrel 10 is provided inside the stationary barrel 13 with a helicoid ring (first advancing/retracting barrel) 25 and is provided inside the helicoid ring 25 with a linear guide ring 26. The helicoid ring 25 is provided on an outer peripheral surface thereof with a male helicoid 25a. The male helicoid 25a is engaged with the female helicoid 13a of the stationary barrel 13, and a plurality of radial projections 26a of the linear guide ring 26 are engaged in the plurality of linear guide grooves 13b of the stationary barrel 13. The helicoid ring 25 and the linear guide ring 26 are coupled to each other to be rotatable relative to each other and integrally movable in the optical axis direction. Specifically, a front plurality of guide projections 26b and a rear plurality of projections 26b, which are formed on an outer peripheral surface of the linear guide ring 26, are respectively engaged in a front circumferential groove 25b and a rear circumferential groove 25b, which are formed on an inner peripheral surface of the helicoid ring 25.

The helicoid ring 25 is provided on threads of the male helicoid 25a with an annular gear which is in mesh with the zoom gear 22, and the helicoid ring 25 is provided on an inner peripheral surface thereof with a plurality of rotational transfer grooves 25c which extend parallel to the photographing optical axis Z1. The zoom lens barrel 10 is provided with a cam ring 27 which is fitted in the linear guide ring 26, and the cam ring 27 is provided with a plurality of followers 27a which project radially outwards to be engaged in the plurality of rotational transfer grooves 25c through a plurality of cam slots 26c formed through the linear guide ring 26, respectively. Accordingly, a rotation of the helicoid ring 25 by a rotation of the zoom gear 22 causes this rotation of the helicoid ring 25 to be transferred to the cam ring 27 via the rotational transfer grooves 25c, the cam slots 26c and the followers 27a. The position of the cam ring 27 in the optical axis direction is determined by the position of the linear guide ring 26 in the optical axis direction and the contours of the plurality of cam slots 26c.

The cam ring 27 is provided on an outer peripheral surface thereof with a plurality of outer surface cam grooves 27b1 and 27b2 which determine the moving path (manner of movement in the optical axis direction) of a barrier support ring (third advancing/retracting barrel) 30 of the zoom lens barrel 10. The barrier support ring 30 supports a lens barrier 29 and a first lens group frame 28 that supports the first lens group L1. The cam ring 27 is provided on an inner peripheral surface thereof with a plurality of inner surface cam grooves 27c which determine the moving path (manner of movement in the optical axis direction) of a second lens group frame (front lens group support frame) 31 of zoom lens barrel 10 that supports the second lens group (front lens group) L2.

On the other hand, the zoom lens barrel 10 is provided, over the cam ring 27, with a second advancing/retracting barrel 32 which is linearly guided by the linear guide ring 26. The second advancing/retracting barrel 32 and the cam ring 27 are coupled to each other so as to be rotatable relative to each other and integrally movable in the optical axis direction. In addition, the first lens group frame 28, the barrier support ring 30 and the second lens group frame 31 are linearly guided directly or indirectly by the second advancing/retracting barrel 32, and a rotation of the cam ring 27 causes the first lens group frame 28, the barrier support ring 30 and the second lens group frame 31 to move forward and rearward in the optical axis direction.

In addition, the zoom lens barrel 10 is provided radially inside the cam ring 27 with a third lens group support ring (rear lens group support frame) 33. The third lens group support ring 33 supports a third lens group frame (rear lens group support frame) 42 that supports the third lens group (rear lens group) L3. The third lens group support ring 33 is coupled to the cam ring 27 to be rotatable relative to the cam ring 27 and to integrally move with the cam ring 27 in the optical axis direction. The third lens group support ring 33 is guided linearly by the second lens group frame 31.

The zoom lens barrel 10 is provided, radially inside the cam ring 27, with a shutter (rear lens group support frame) 34 and a spring-retaining annular plate (rear lens group support frame) 35 which are fixed to the front of the third lens group support ring (rear lens group support frame) 33. The zoom lens barrel 10 is provided between the second lens group frame (front lens group support frame) 31 and the spring-retaining annular plate (rear lens group support frame) 35 with a diaphragm 38, which is movable in the optical axis direction, the aperture diameter of which is fixed and limits the amount of light passing therethrough depending on the position of the diaphragm 38 in the optical axis direction. The diaphragm 38 is held between a first compression coil spring (first spring member) 36 and a second compression coil spring (second spring member) 37 to be supported therebewteen in a floating state (suspended state). The first compression coil spring 36 is supported between the second lens group frame 31 and the diaphragm 38 to bias the second lens group frame 31 and the diaphragm 38 in directions away from each other, and the second compression coil spring 37 is supported between the diaphragm 38 and the spring-retaining annular plate 35 to bias the diaphragm 38 and the spring-retaining annular plate 35 in directions away from each other.

The zoom lens barrel 10 is provided, immediately behind the third lens group support ring 33, with an anti-shake base (image stabilizer) 40 which is driven in a plane orthogonal to the photographing optical axis Z1 in directions to cancel out vibrations applied to the camera body, in which the zoom lens barrel 10 is incorporated. The third lens group frame 42 that supports the third lens group L3 is supported by the anti-shake base 40 thereon to be swingable about a shaft 41 which is positioned away from the photographing optical axis Z1 and extends parallel to the photographing optical axis Z1. An anti-shake cover 43 supports the anti-shake base 40 between the anti-shake cover 43 and the third lens group support ring 33. The third lens group frame 42 holds the third lens group L3 on the photographing optical axis Z1 when the zoom lens barrel 10 is in a ready-to-photograph state that is shown in FIGS. 2 and 3. When the zoom lens barrel 10 moves to the lens barrel accommodated state that is shown in FIG. 1, the third lens group frame 42 is rotated about the shaft 41 to remove the third lens group L3 from the photographing optical axis Z1 to the accommodated (displaced) position shown in FIG. 1. The above described anti-shake mechanism and lens group removal mechanism are known in the art and are not directly related to the main concept of the present invention, so a detailed description of these mechanisms will not be provided.

A characteristic feature of the illustrated embodiments of the zoom lens barrel 10, according to the present invention, resides in the first compression coil spring (first spring member) 36, the second compression coil spring (second spring member) 37 and the diaphragm 38, which are positioned between the second lens group frame (front lens group support frame) 31 and the spring-retaining annular plate (rear lens group support frame) 35. The first compression coil spring (first spring member) 36, the second compression coil spring (second spring member) 37 and the diaphragm 38 will be hereinafter discussed in detail with reference to FIGS. 5A through 8.

[First Embodiment]

FIGS. 5A, 5B, 5C and 6 show a first embodiment of a biasing and supporting structure of the zoom lens barrel 10, according to the present invention, which biases and supports the diaphragm 38. As shown in FIGS. 5A, 5B and 5C, the second lens group frame 31, the spring-retaining annular plate 35 and the diaphragm 38 move relative to one another in the optical axis direction so as to approach one another during zooming from the wide-angle extremity to the telephoto extremity.

The first compression coil spring 36 is installed to be fully extended when the zoom lens barrel 10 is set at the wide-angle extremity, and exerts a force (spring load in a fully-extended state of the first compression coil spring 36 at the time of installation thereof) on both the second lens group frame 31 and the diaphragm 38 so as to bias the second lens group frame 31 and the diaphragm 38 away from each other. The second compression coil spring 37 is installed so as to be fully extended when the zoom lens barrel 10 is set at the wide-angle extremity, and exerts a force (spring load in a fully-extended state of the second compression coil spring 37 at the time of installation thereof) on both the diaphragm 38 and the spring-retaining annular plate 35 so as to bias the diaphragm 38 and the spring-retaining annular plate 35 away from each other.

The diaphragm 38 is provided with three stop lugs (stoppers/contact engagement portions) 38a, circumferentially arranged at intervals of 120 degrees, and the third lens group support ring 33 is provided with three stop lugs (stoppers/contact engagement portions) 33a circumferentially arranged at intervals of 120 degrees. Engagement between the three stop lugs 38a and the three stop lugs 33a determines the mechanical forward movement limit of the diaphragm 38 relative to the third lens group support ring 33 (defines the maximum distance between the diaphragm 38 and the third lens group support ring 33) with the second compression coil spring 37 fully extended (maximum extended state) at the time of installation thereof maintained.

The spring load P(N) of a compression coil spring can be calculated from the following equation:

$$P = k \cdot \delta,$$

wherein k represents the spring constant (N/mm) of the compression coil spring, and δ represents the amount of displacement (mm) of the compression coil spring from a free state.

Since the spring constant of the compression coil spring k(N/mm) is invariant, the spring load P(N) of the compression coil spring increases as the amount of displacement δ(mm) from a free state increases upon the compression coil spring being compressed from the fully extended state at the time of installation thereof.

In the first embodiment of the biasing and supporting structure, the spring loads of the first compression coil spring 36 and the second compression coil spring 37 are set so that firstly the first compression coil spring 36 is compressed while the second compression coil spring 37 is not compressed and subsequently the second compression coil spring 37 is compressed after the first compression coil spring 36 is fully compressed when the second lens group frame 31 and the spring-retaining annular plate 35 approach each other during zooming from the wide-angle extremity to the telephoto extremity. More specifically, the spring load of the first compression coil spring 36 in a fully compressed state is set to be smaller than the spring load of the second compression coil spring 37 in the fully extended state at the time of installation thereof. Accordingly, the position of the diaphragm 38 in the optical axis direction during zooming from the wide-angle extremity to the telephoto extremity can be precisely determined, which makes it possible to obtain a desired aperture effect by precisely determining the amount of light passing through the diaphragm 38.

It is desirable for the following condition (1) to be satisfied:

$$PY1/PX1 \geq 1.5 \quad (1),$$

wherein PX1 represents the spring load (N) of the first compression coil spring 36 in a fully compressed state, and PY1 represents the spring load (N) of the second compression coil spring 37 in the fully extended state at the time of installation thereof.

By satisfying this condition, it becomes possible to compress the second compression coil spring 37 after the first compression coil spring 36 is fully compressed, even if variations in spring force (spring constant) due to manufacturing errors or resistance due to friction exist. If condition (1) is not satisfied, the spring load of the first compression coil spring 36 during zooming from the wide-angle extremity to the telephoto extremity becomes greater than the spring load of the second compression coil spring 37 in the fully extended state at the time of installation thereof if variations in spring force (spring constant) due to manufacturing errors or resistance due to friction exist; consequently, there is a possibility of the second compression coil spring 37 being compressed before the first compression coil spring 36 becomes fully compressed. In such a case, the position of the diaphragm 38 in the optical axis direction during zooming from the wide-angle extremity to the telephoto extremity cannot be precisely determined, which makes it impossible to obtain a desired aperture effect by precisely determining the amount of light passing through the diaphragm 38.

Figure 5:
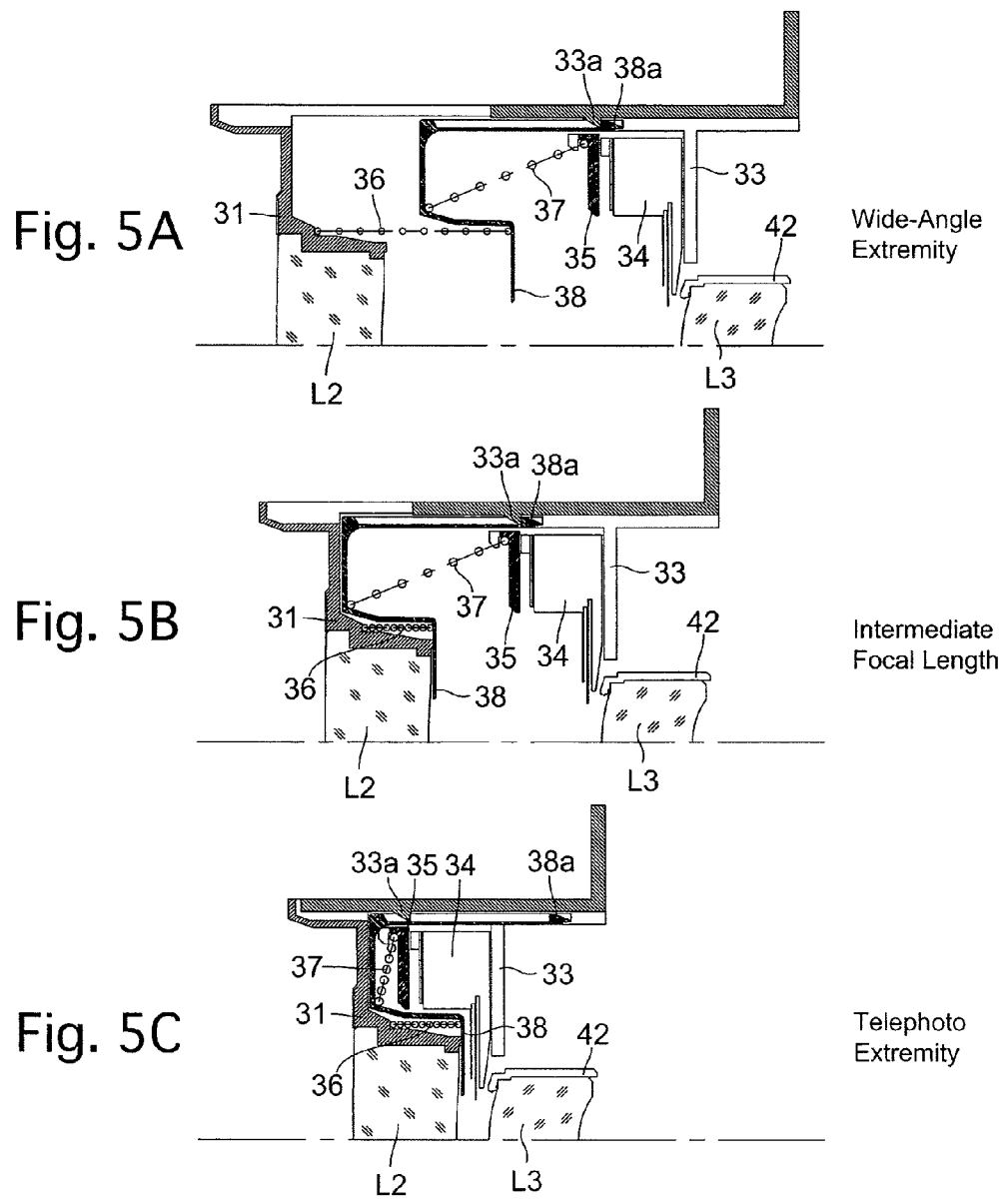
FIG. 5A is a cross sectional view showing a first embodiment of a biasing and supporting structure which biases and supports a diaphragm, which is movable in the optical axis direction, incorporated in the zoom lens barrel, in a ready-to-photograph state of the zoom lens barrel set at the wide-angle extremity.
FIG. 5B is a cross sectional view showing the first embodiment of a biasing and supporting structure which biases and supports the diaphragm incorporated in the zoom lens barrel, in a ready-to-photograph state of the zoom lens barrel with a first compression spring fully compressed.
FIG. 5C is a cross sectional view showing the first embodiment of the biasing and supporting structure which biases and supports the diaphragm incorporated in the zoom lens barrel, in a ready-to-photograph state of the zoom lens barrel set at the telephoto extremity.
Figure 6:
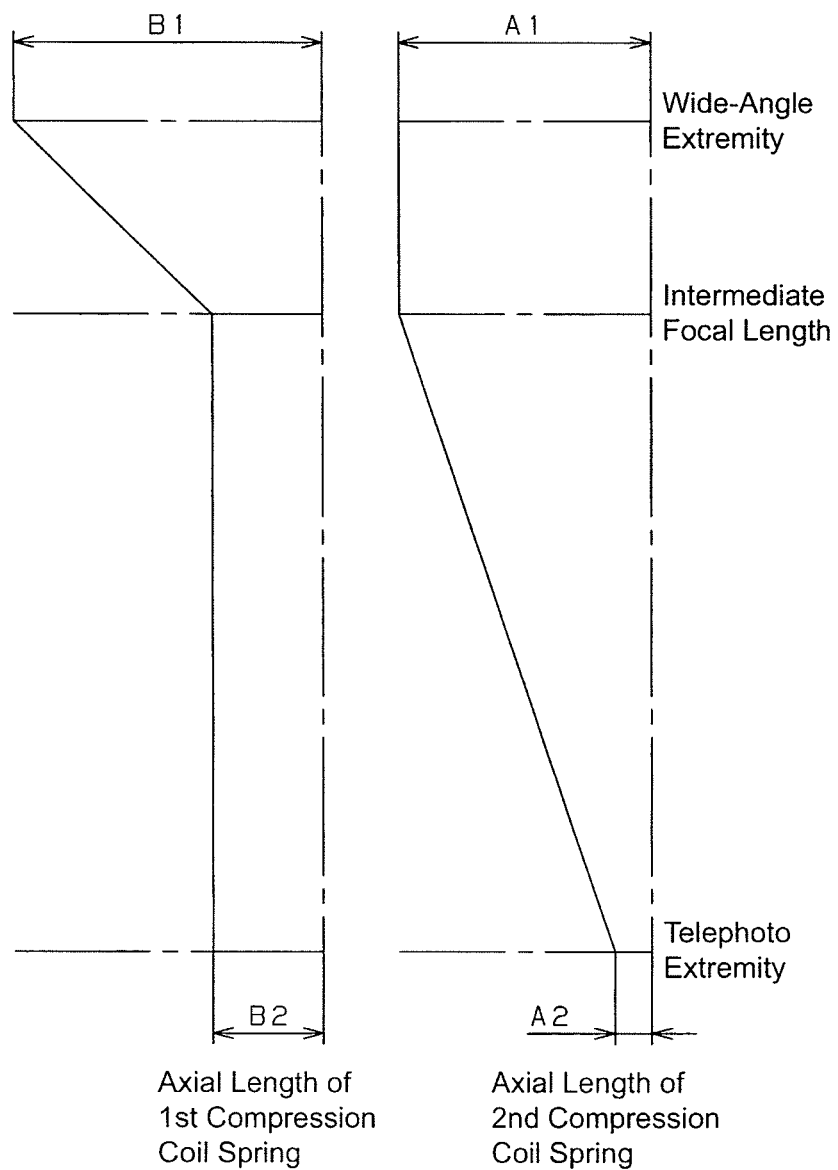
FIG. 6 is a diagram showing variations in degree of compression of the first compression spring and the second compression spring in the first embodiment of the biasing and supporting structure, when zooming from the wide-angle extremity to the telephoto extremity is performed.

Variations in the compressed state of the first compression coil spring 36 and the second compression coil spring 37 during zooming from the wide-angle extremity to the telephoto extremity will be hereinafter discussed with reference to FIGS. 5A through 6.

When the zoom lens barrel 10 is set at the wide-angle extremity as shown in FIG. 5A, each of the first compression coil spring 36 and the second compression coil spring 37 is installed to provide a spring load in a fully extended state. In this installed state, the spring load of the first compression coil spring 36 is sufficiently smaller than that of the second compression coil spring 37. In addition, the three stop lugs 38a of the diaphragm 38 and the three stop lugs 33a of the third lens group support ring 33 are in contact engagement with each other. As shown in FIG. 6, when the zoom lens barrel 10 is set at the wide-angle extremity, the axial length of the first compression coil spring 36 in a fully extended state is B1 (mm) and the axial length of the second compression coil spring 37 in a fully extended state is A1 (mm).

As the second lens group frame 31 and the spring-retaining annular plate 35 approach each other during zooming from the wide-angle extremity to the telephoto extremity, the zoom lens barrel 10 is set at an intermediate focal length at which the first compression coil spring 36 is compressed while the second lens group frame 31 and the diaphragm 38 come in contact with each other, after approaching each other, as shown in FIG. 5B. At this intermediate focal length, the first compression coil spring 36 is in a fully compressed state and therefore cannot be further compressed. On the other hand, in the focal length range from the wide-angle extremity until the intermediate focal length, the second compression coil spring 37 remains in the fully extended state, as that at the time of installation thereof, while the distance between the diaphragm 38 and the spring-retaining annular plate 35 remains constant. In addition, the three stop lugs 38a of the diaphragm 38 and the three stop lugs 33a of the third lens group support ring 33 remain engaged with each other. As shown in FIG. 6, when the zoom lens barrel 10 is set at the intermediate focal length, the axial length of the first compression coil spring 36 is B2 (mm) in a fully compressed state and the axial length of the second compression coil spring 37 remains at A1 (mm) in a fully extended state.

Upon the second lens group frame 31 and the spring-retaining annular plate 35 further approaching each other, the contact engagement between the three stop lugs 38a of the diaphragm 38 and the three stop lugs 33a of the third lens group support ring 33 is released, and the diaphragm 38 and the spring-retaining annular plate 35 approach each other and come into contact with each other while compressing the second compression coil spring 37, which completes a zooming operation to the telephoto extremity. At the telephoto extremity, the second compression coil spring 37 is in a fully compressed state and therefore cannot be further compressed. As shown in FIG. 6, when the zoom lens barrel 10 is set at the telephoto extremity, the axial length of the first compression coil spring 36 is B2 (mm) in a fully compressed state and the axial length of the second compression coil spring 37 is A2 (mm) in a fully compressed state.

[Second Embodiment]

FIGS. 7A, 7B, 7C and 8 show a second embodiment of the biasing and supporting structure of the zoom lens barrel 10, according to the present invention, which biases and supports the diaphragm 38. As shown in FIGS. 7A, 7B and 7C, the diaphragm 38 is provided with a plurality of stop lugs (stoppers/contact engagement portions) 38b, and the second lens group frame 31 is provided with a corresponding plurality of stop recesses (stoppers/contact engagement portions) 31a. Engagement between the plurality of stop lugs 38b and the plurality of stop recesses 31a determines the mechanical rearward limit of the diaphragm 38 relative to the second lens group frame 31 (defines the maximum distance between the diaphragm 38 and the second lens group frame 31) with the first compression coil spring 36 fully extended state (maximum extended state) at the time of installation thereof maintained.

In the second embodiment of the biasing and supporting structure, contrary to the above described first embodiment of the biasing and supporting structure, the spring loads of the first compression coil spring 36 and the second compression coil spring 37 are set so that firstly the second compression coil spring 37 is compressed while the first compression coil spring 36 is not compressed, and subsequently the first compression coil spring 36 is compressed after the second compression coil spring 37 is fully compressed when the second lens group frame 31 and the spring-retaining annular plate 35 approach each other during zooming from the wide-angle extremity to the telephoto extremity. More specifically, the spring load of the second compression coil spring 37 in a fully compressed state is set to be smaller than the spring load of the first compression coil spring 36 in the fully extended state at the time of installation thereof. Accordingly, the position of the diaphragm 38 in the optical axis direction during zooming from the wide-angle extremity to the telephoto extremity can be precisely determined, which makes it possible to obtain a desired aperture effect by precisely determining the amount of light passing through the diaphragm 38.

It is desirable for the following condition (2) to be satisfied:

$$PY2/PX2 \geq 1.5 \qquad (2),$$

wherein PX2 represents the spring load (N) of the second compression coil spring 37 in a fully compressed state, and PY2 represents the spring load (N) of the first compression coil spring 36 in the fully extended state at the time of installation thereof.

By satisfying this condition, it becomes possible to compress the first compression coil spring 36 after the second compression coil spring 37 is fully compressed, even if variations in spring force (spring constant) due to manufacturing errors or resistance due to friction exist. If condition (2) is not satisfied, the spring load of the second compression coil spring 37 during zooming from the wide-angle extremity to the telephoto extremity becomes greater than the spring load of the first compression coil spring 36 in the fully extended state at the time of installation thereof if variations in spring force (spring constant) due to manufacturing errors or resistance due to friction exist; consequently, there is a possibility of the first compression coil spring 36 being compressed before the second compression coil spring 37 becomes fully compressed. In such a case, the position of the diaphragm 38 in the optical axis direction during zooming from the wide-angle extremity to the telephoto extremity cannot be precisely determined, which makes it impossible to obtain a desired aperture effect by precisely determining the amount of light passing through the diaphragm 38.

Figure 7:
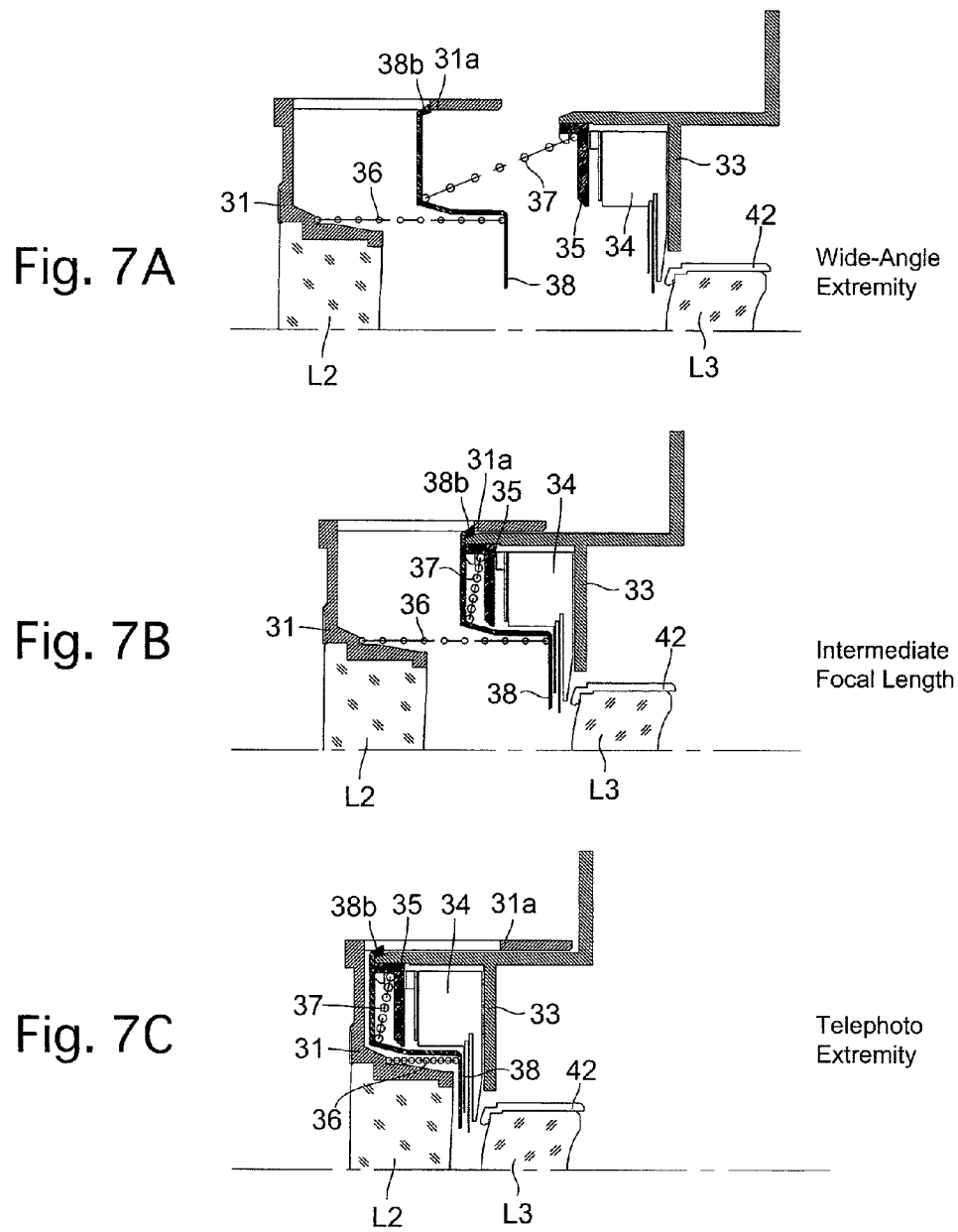
FIG. 7A is a cross sectional view showing a second embodiment of a biasing and supporting structure which biases and supports a diaphragm, which is movable in the optical axis direction, incorporated in the zoom lens barrel, in a ready-to-photograph state of the zoom lens barrel set at the wide-angle extremity.
FIG. 7B is a cross sectional view showing the second embodiment of a biasing and supporting structure which biases and supports the diaphragm incorporated in the zoom lens barrel, in a ready-to-photograph state of the zoom lens barrel with a second compression spring fully compressed.
FIG. 7C is a cross sectional view showing the second embodiment of the biasing and supporting structure which biases and supports the diaphragm incorporated in the zoom lens barrel, in a ready-to-photograph state of the zoom lens barrel set at the telephoto extremity.
Figure 8:
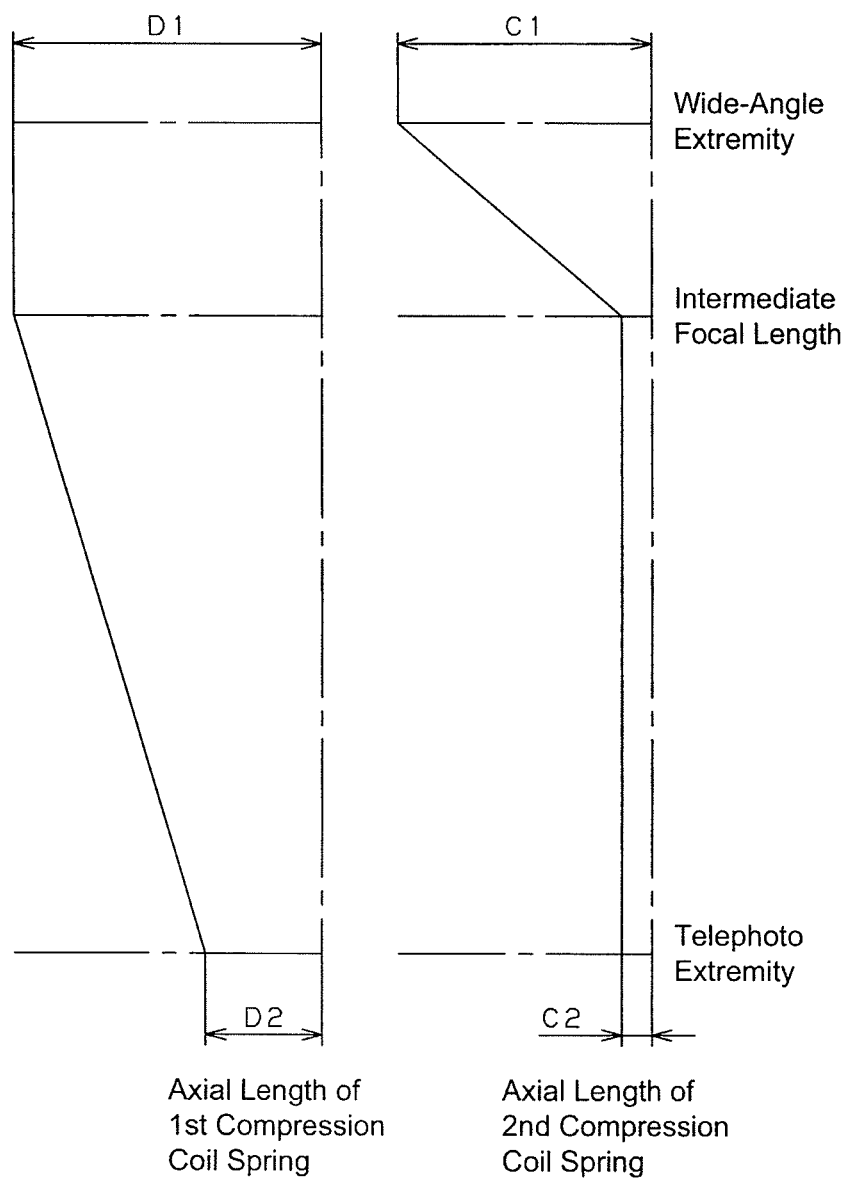
FIG. 8 is a diagram showing variations in degree of compression of the first compression spring and the second compression spring in the second embodiment of the biasing and supporting structure, when zooming from the wide-angle extremity to the telephoto extremity is performed.

Variations in the compressed state of the first compression coil spring 36 and the second compression coil spring 37 during zooming from the wide-angle extremity to the telephoto extremity in the second embodiment of the biasing and supporting structure will be hereinafter discussed with reference to FIGS. 7A through 8.

When the zoom lens barrel 10 is set at the wide-angle extremity as shown in FIG. 7A, each of the first compression coil spring 36 and the second compression coil spring 37 is installed to provide a spring load in a fully extended state. In this installed state, the spring load of the second compression coil spring 37 is sufficiently smaller than that of the first compression coil spring 36. In addition, the plurality of stop lugs 38b of the diaphragm 38 and the plurality of stop recesses 31a of the second lens group frame 31 are in contact engagement with each other. As shown in FIG. 8, when the zoom lens barrel 10 is set at the wide-angle extremity, the axial length of the first compression coil spring 36 is D1 (mm) in a fully extended state, and the axial length of the second compression coil spring 37 is C1 (mm) in a fully extended state.

As the second lens group frame 31 and the spring-retaining annular plate 35 approach each other during zooming from the wide-angle extremity to the telephoto extremity, the zoom lens barrel 10 is set at an intermediate focal length at which the second compression coil spring 37 is compressed while the diaphragm 38 and the spring-retaining annular plate 35 come in contact with each other, as shown in FIG. 7B. At this intermediate focal length, the second compression coil spring 37 is in a fully compressed state, and therefore, cannot be further compressed. On the other hand, in the focal length range from the wide-angle extremity until the intermediate focal length, the first compression coil spring 36 remains in the fully extended state at the time of installation thereof while the distance between the second lens group frame 31 and the diaphragm 38 is constant due to engagement between the plurality of stopper lugs 38b and the plurality of stopper recesses 31a. As shown in FIG. 8, when the zoom lens barrel 10 is set at the intermediate focal length, the axial length of the first compression coil spring 36 remains D1 (mm) in a fully extended state, and the axial length of the second compression coil spring 37 is C2 (mm) in a fully compressed state.

Bringing the second lens group frame 31 and the spring-retaining annular plate 35 to further approach each other causes the contact engagement between the plurality of stop lugs 38b of the diaphragm 38 and the plurality of stop recesses 31a of the second lens group frame 31 to be released, and causes the second lens group frame 31 and the diaphragm 38 to approach each other and come into contact with each other while compressing the first compression coil spring 36, which completes a zooming operation to the telephoto extremity. At the telephoto extremity, the first compression coil spring 36 is in a fully compressed state, and therefore, cannot be further compressed. As shown in FIG. 8, when the zoom lens barrel 10 is set at the telephoto extremity, the axial length of the first compression coil spring 36 is D2 (mm) in a fully compressed state, and the axial length of the second compression coil spring 37 is C2 (mm) in a fully compressed state.

As described above, in the first and second embodiments of the zoom lens barrel 10, the first spring member 36 is positioned between the front lens group support frame 31 and the diaphragm 38 to bias the front lens group support frame 31 and the diaphragm 38 in directions away from each other, the second spring member 37 is positioned between the diaphragm 38 and the rear lens group support frame (33, 34 and/or 35) to bias the diaphragm 38 and the rear lens group support frame 35 in directions away from each other, and the spring loads of the first spring member 36 and the second spring member 37 are determined such that, when the front lens group support frame 31 and the rear lens group support frame 35 approach each other during zooming, one of the first and second spring members (36 and 37) is compressed and the other of the first and second spring members (36 and 37) is not compressed, and the other of the first and second spring members (36 and 37) is compressed after the one of the first and second spring members (36 and 37) is fully compressed. As a result, the position of the diaphragm 38 on the photographing optical axis Z1 is determined not by a balance between the first spring member 36 and the second spring member 37 but according to the amounts of movement of the front lens group support frame 31 and the rear lens group support frame 35. Therefore, even if there is some manufacturing error (e.g., ±15%) in spring force of the first spring member 36 and the second spring member 37, the position of the diaphragm 38 in the optical axis direction during zooming from the wide-angle extremity to the telephoto extremity can be precisely determined, which makes it possible to obtain a desired aperture effect by precisely determining the amount of light passing through the diaphragm 38.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel provided with a front lens group, a rear lens group and a diaphragm, which is movable in the optical axis direction and positioned between said front lens group and said rear lens group, wherein said front lens group, said rear lens group and said diaphragm are supported to be movable relative to one another in an optical axis direction and move relative to one another in said optical axis direction during zooming, said zoom lens barrel comprising:
   a front lens group support frame which supports said front lens group;
   a rear lens group support frame which supports said rear lens group;
   a first spring provided between said front lens group support frame and said diaphragm to bias said front lens group support frame and said diaphragm in directions away from each other in an entire zooming range between the wide-angle extremity and the telephoto extremity; and
   a second spring provided between said diaphragm and said rear lens group support frame to bias said diaphragm and said rear lens group support frame in directions away from each other in said entire zooming range,
   wherein spring loads of said first spring and said second spring are determined such that, when said front lens group support frame and said rear lens group support frame approach each other during zooming, one of said first spring and said second spring is compressed and the other of said first spring and said second spring is not compressed during zooming, and subsequently, said other of said first spring and said second spring is compressed after said one of said first spring and said second spring is fully compressed during zooming.

2. The zoom lens barrel according to claim 1, further comprising a stopper which defines a maximum distance between said front lens group support frame and said diaphragm, while maintaining a fully extended state of said first spring at a time of installation thereof.

3. The zoom lens barrel according to claim 2, wherein said stopper comprises a contact engagement portion provided on each of said front lens group support frame and said diaphragm,
   wherein engagement between said contact engagement portions of said front lens group support frame and said diaphragm defines said maximum distance between said front lens group support frame and said diaphragm.

4. The zoom lens barrel according to claim 1, further comprising a stopper which defines a maximum distance between said diaphragm and said rear lens group support frame, while maintaining a fully extended state of said second spring at a time of installation thereof.

5. The zoom lens barrel according to claim 4, wherein said stopper comprises a contact engagement portion provided on each of said diaphragm and said rear lens group support frame,
wherein engagement between said contact engagement portions of said diaphragm and said rear lens group support frame defines said maximum distance between said diaphragm and said rear lens group support frame.

6. The zoom lens barrel according to claim 1, wherein a spring load of one of said first spring and said second spring in a fully compressed state is set to be smaller than a spring load of the other of said first spring and said second spring in a fully extended state at a time of installation thereof.

7. The zoom lens barrel according to claim 6, wherein the following condition is satisfied:

$$PY/PX \geq 1.5,$$

wherein PX represents said spring load of said one of said first spring and said second spring in said fully compressed state, and PY represents said spring load of said other of said first spring and said second spring in said fully extended state at said time of installation thereof.

8. The zoom lens barrel according to claim 1, wherein, when said front lens group support frame and said rear lens group support frame approach each other during zooming, said first spring is compressed while said second spring is not compressed, and subsequently, said second spring is compressed after said first spring is fully compressed.

9. The zoom lens barrel according to claim 1, wherein, when said front lens group support frame and said rear lens group support frame approach each other during zooming, said second spring is compressed while said first spring is not compressed, and subsequently, said first spring is compressed after said second spring is fully compressed.

10. The zoom lens barrel according to claim 1, wherein each of said first spring and said second spring comprises a compression coil spring.

* * * * *